B. H. SKINNER.
ELECTRICAL TESTING SET.
APPLICATION FILED MAY 27, 1916.

1,236,491.

Patented Aug. 14, 1917.
4 SHEETS—SHEET 1.

Witness:

Inventor
Benjamin H. Skinner,

B. H. SKINNER.
ELECTRICAL TESTING SET.
APPLICATION FILED MAY 27, 1916.
1,236,491.
Patented Aug. 14, 1917.
4 SHEETS—SHEET 2.
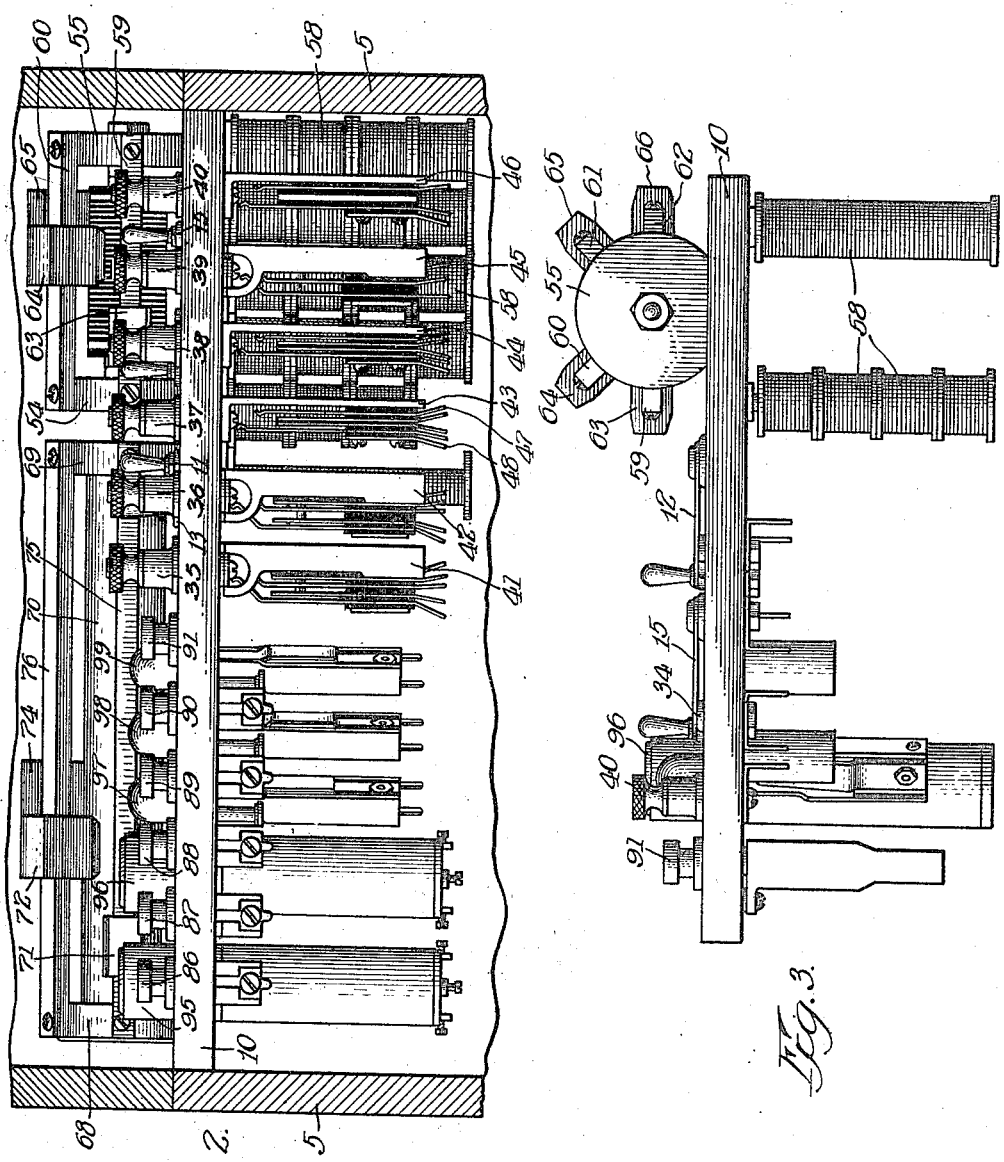

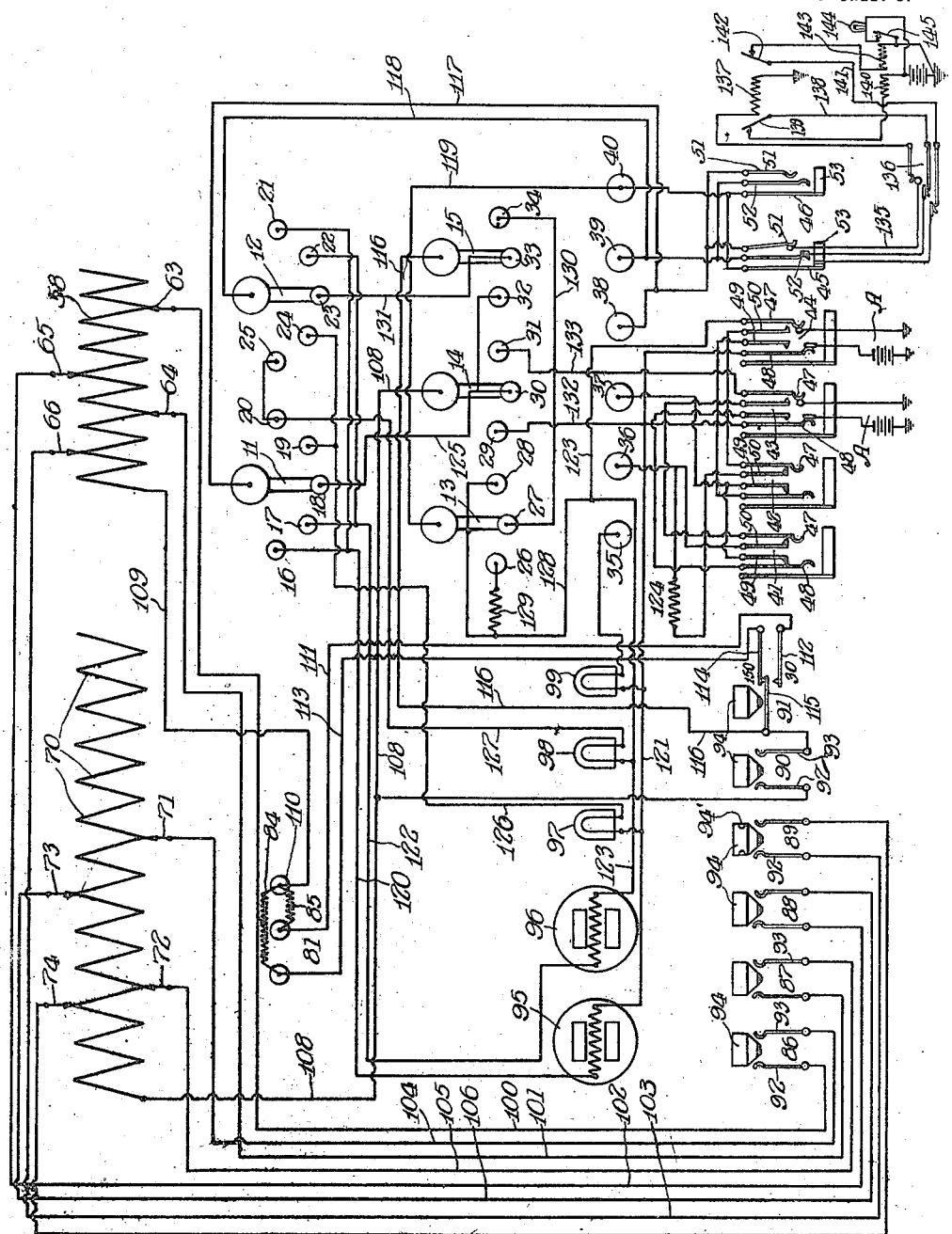

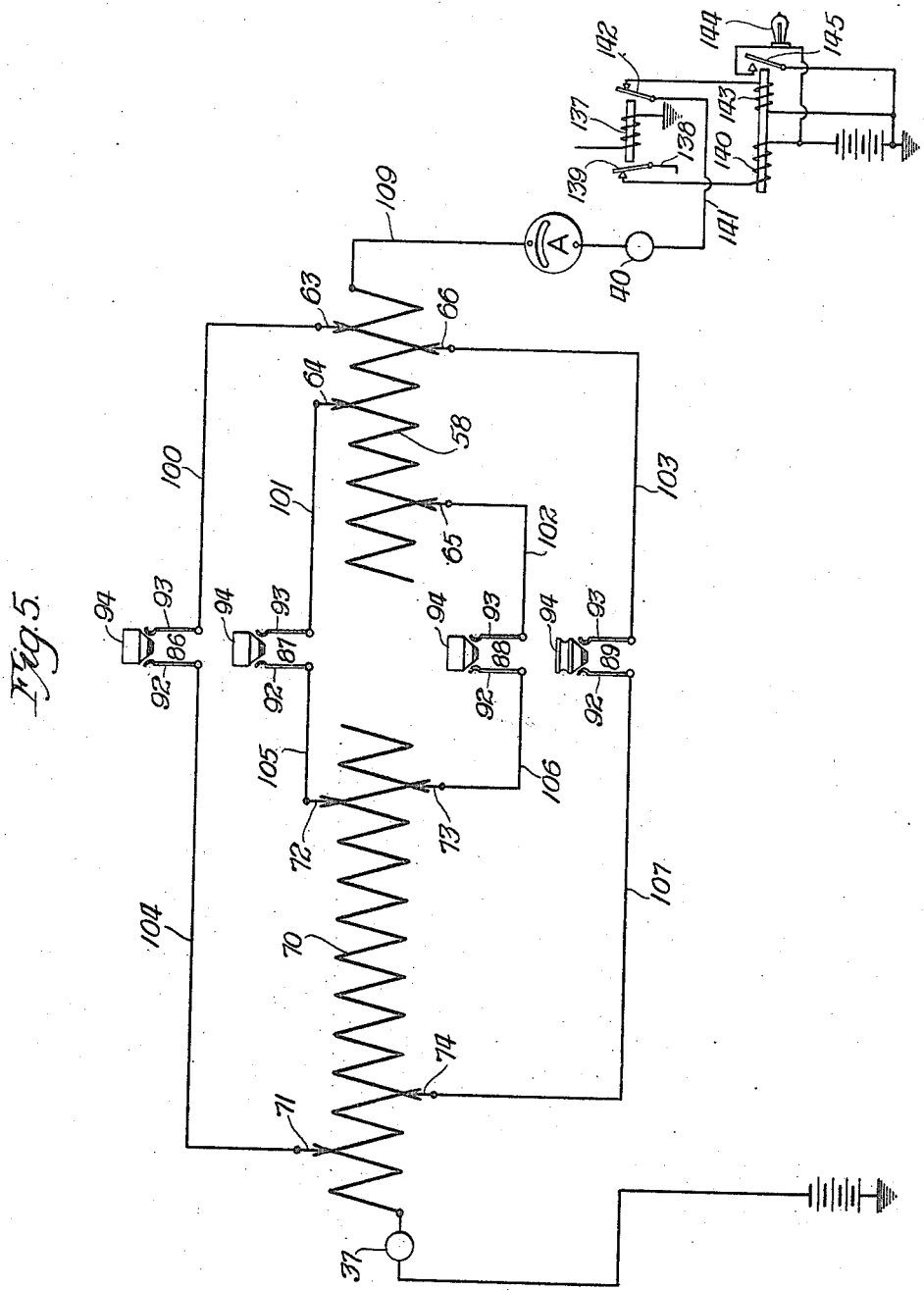

UNITED STATES PATENT OFFICE.

BENJAMIN H. SKINNER, OF BERWYN, ILLINOIS, ASSIGNOR TO WESTERN ELECTRIC COMPANY, OF NEW YORK, N. Y., A CORPORATION OF NEW YORK.

ELECTRICAL TESTING SET.

1,236,491.   Specification of Letters Patent.   Patented Aug. 14, 1917.

Application filed May 27, 1916. Serial No. 100,222.

*To all whom it may concern:*

Be it known that I, BENJAMIN H. SKINNER, a citizen of the United States, residing at Berwyn, in the county of Cook and State of Illinois, have invented certain new and useful Improvements in Electrical Testing Sets, of which the following is a full, clear, concise, and exact description.

This invention relates to an improved electrical testing set particularly adapted for use in telephone central exchanges.

In telephone exchanges, various tests must periodically be made on the relays, resistance coils, resistance circuits and other apparatus and circuits to insure proper and efficient operation of the telephone system under normal conditions. For example, the various relays which control the signaling, talking and ringing circuits must be periodically tested and adjusted, if necessary, so that they will properly respond. A relay must respond and operate efficiently when an operating current at or above a certain value is sent through the energizing winding, and the relay must not operate or respond when the current sent therethrough is below a certain predetermined value. The relay, after being operated, must hold and must not release up to a certain current reduction, and must release when a predetermined current minimum is reached.

The above tests are the ones ordinarily made in central exchanges. Heretofore, such tests and other tests have been made in a more or less disorderly and inefficient manner. The various resistances, signals, switches and other parts have been connected by lengths of wires, and conductors were run to ground and to battery. With this temporary and somewhat crude arrangement, contacts and connections can readily loosen or become broken and the testing is laborious, tedious, time-consuming, and more or less uncertain.

The object of the invention is to provide means for greatly simplifying such testing and to make it more certain and reliable by so arranging and mounting the various resistance elements, switches, signals, keys, etc., in a housing or box of small size, with the various parts permanently connected together, that it will be unnecessary to run special conductors to get the necessary connections for testing. An important feature of my invention is that ordinary switchboard cords can be utilized for connecting ground and battery, and the various relays to be tested, with the test set. Such cord connections are the only connections necessary with my test set. Such connections in the set include circuit building switches, variable resistances, indicating instruments and signals, circuit closing keys, plug receiving jacks, etc., and after connection with the test set of ground and battery, and the relay or other device to be tested, the desired circuits are set up and controlled and results observed on the instruments and signals.

Another object consists in an improved test set in which a plurality of adjustable resistances are employed, on each of which a plurality of resistance tests may be simultaneously set up which may thereafter be successively connected into the testing circuit for the purpose of making a plurality of tests. This arrangement will permit a resistance setting for a plurality of tests, any one of which may be made at will without in any way disturbing the resistance settings on the same coils for any of the other tests.

The improved test set and its uses are illustrated in the accompanying drawings in which—

Fig. 2 is a side elevational view of the testing apparatus with the inclosure in section;

Fig. 3 is an end view of the supporting plate and apparatus mounted thereon;

Fig. 4 is a circuit diagram illustrating the operation and utility of the device; and Fig. 5 is a theoretical diagram showing the circuit connections used for switching the various resistances into the test circuit.

Figure 1:
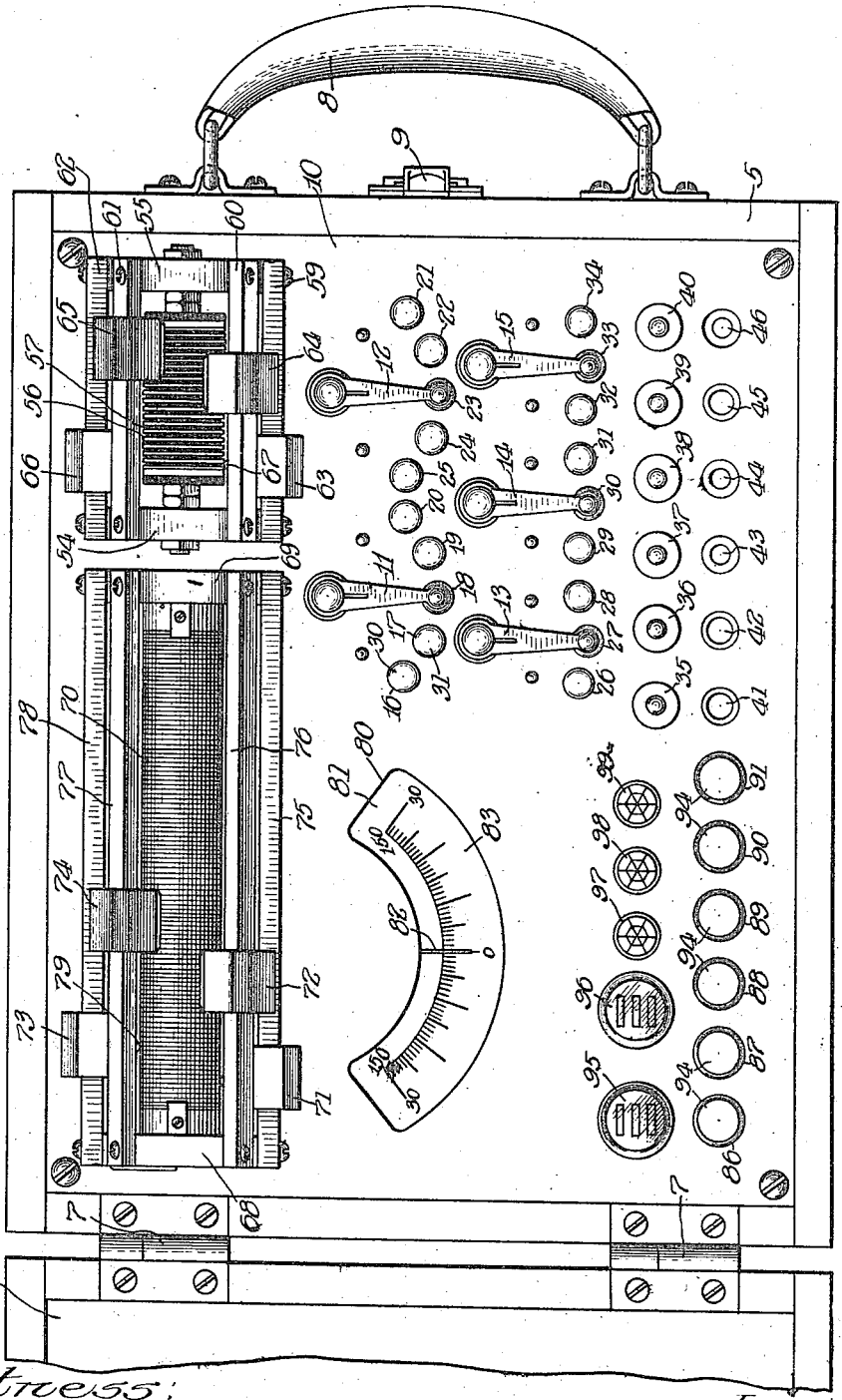
Figure 1 is a plan view of a test set which embodies the invention.

The inclosure shown comprises a rectangular box 5 to which a cover is attached by separable hinges 7, a handle 8 and a lock 9 being provided. Detachably mounted in the box at the top thereof is a supporting plate or base 10 for the testing apparatus and circuit. Describing first the apparatus, five switch levers, 11, 12, 13, 14, and 15 are mounted on the base as shown. For the lever 11 contacts 16, 17, 18, 19 and 20 are provided; for lever 12 contacts 21, 22, 23, 24 and 25 are provided; for switch lever 13 contacts 26, 27, and 28 are provided; for switch lever 14 contacts 29, 30, and 31 are provided; and for switch lever 15 contacts 32, 33 and 34 are provided. In front of the switches is a row of terminal posts 35, 36, 37, 38, 39 and 40, and, in front of these posts, the thimbles of spring jacks 41, 42, 43, 44, 45 and 46 are mounted in the base 10. Each of the jacks 41, 42, 43 and 44 has a tip contact spring 47 and a sleeve contact spring 48, and the contacts 49 and 50 normally engage with the springs 47 and 48 respectively. Each of jacks 45 and 46 has a spring 51, springs 52 and the thimble 53 for receiving respectively the tip, ring and sleeve of switch-board plugs.

To the rear of the switches, supporting disks 54 and 55 are mounted, between which is supported the terminal cylinder built up of contact disks 56 and insulating disks 57 arranged alternately, the contact disks being connected with the various resistance coils 58 which are suspended from the bottom of the base 10. Supported on and bridging between the end disks 54 and 55 and parallel with the terminal cylinder are the bars 59, 60, 61 and 62, on which contact brushes 63, 64, 65 and 66, respectively, are slidably mounted. The contact point or end 67 of each brush may be brought into engagement with any terminal disk 56 as the brush is slid on its bar. The base 10 also supports end disks 68 and 69 between which is suspended the resistance coil or winding 70. Brushes 71, 72, 73 and 74 are slidable on bars 75, 76, 77 and 78 which are supported on the end disks 68 and 69 parallel with the resistance winding so that, when a brush is shifted on its bar, its contact point 79 will be brought into contact with any turn of the resistance winding. As will be shown later, the resistance 58 and the resistance 70 are connected in series. The resistances 58 bridged across the terminal disks 56 are of desired values. For telephone exchange testing, these resistances could range from 1000 ohms to 10,000 ohms so that there would be from 1,000 to 50,000 ohms resistance available. The resistance 70 should be about 1,200 ohms. In practice, the brushes for the resistances 58 are set as close as possible to the resistances desired and then the corresponding brushes of the resistance 70 are shifted to get accurately the actual resistances desired.

Secured to the base 10 below the sight opening 80 is a milli-ammeter 81 whose needle 82 coöperates with the scale 83. The ammeter has two coils 84 and 85 (Fig. 4). When the coil 84 is in circuit, the needle which is normally on a central zero indication will indicate in either direction on the 0—150 scale, while, when the coil 85 is in circuit, the needle will indicate on the 0—30 scale.

In front of the ammeter is a row of keys 86, 87, 88, 89, 90 and 91, the key 91 determining which coil of the ammeter shall be included in circuit. Each of the keys 86 to 90 comprises two terminal springs 92 and 93, and a contact button 94 which when depressed electrically connects the springs. All the keys except key 89 are non-locking. Key 89 is locking and for this purpose its button 94 may have a locking groove 94' for receiving the ends of springs 92 and 93 when the button is depressed.

Behind the keys 86 to 91 is a row of signals 95, 96, 97, 98 and 99, the signals 97, 98 and 99 being electrical lamps, while the signals 95 and 96 comprise targets controlled by electromagnets.

Describing now the circuit connections within the test set, the springs 92 of keys 86 to 89, inclusive, are connected by conductors 100, 101, 102 and 103 with the brushes 63, 64, 65, and 66, respectively, associated with the resistance 58. The other springs 93 of these keys are connected by conductors 104, 105, 106 and 107 with the brushes 71, 72, 73 and 74 respectively associated with the resistance 70. The common terminal of resistance 70 is connected by conductor 108 with the switch arm 14, while the common terminal of resistance 58 is connected by conductor 109 with the terminal 110 of the ammeter 81. The coil 85 of the ammeter connects with the terminal 110 and by conductor 111 is connected with the contact 112 of the key 91. The other coil 84 of the ammeter connects with the terminal 110 and by conductor 113 is connected with the contact 114 of the key 91. Normally the button of the key is up and the key spring 115 is in engagement with contact 114, the spring 115 being connected by conductor 116 with the switch arm 15.

By means of binding posts 38, 39 and 40, relay circuits to be tested can be connected directly with the test set, or, where relays to be tested are associated with switch-board cords, connection with the test set can be made by plugging into the jacks 45 and 46. Or, where the relay to be tested is connected with a switch-board jack, the plugs at the end of a connecting cord can be inserted respectively into the switch-board spring jack and into one of the spring jacks 45 and 46 of the test set. As shown, the tip springs 51 of the spring jacks 45 and 46 and the binding post 38 are connected together and by conductor 117 are connected with switch arm 11. The ring springs 52 of the jacks and the terminal post 39 are connected together and by conductor 118 are connected with the switch arm 12. The sleeve contacts 53 of the jacks and the binding post 40 are connected together and by conductor 119 are connected with the switch arm 13.

Battery and ground may be supplied to the test set by running battery and ground conductor to the binding posts 36 and 37, respectively. However, the subscribers answering cords on the station switch-boards have their tip sides connected with ground and their sleeve sides connected with battery. The spring jacks 41, 42, 43 and 44 are provided for receiving plugs of the answering cords in order that battery and ground connection may be supplied to the testing set without requiring running of special conductors. Upon plug connection of answering cords A with the spring jacks, the spring 47 will be connected with ground and the springs 48 with battery.

The contact 16 for the switch arm 11 is connected by conductor 120 with one terminal of the signal 95 whose other terminal is connected by conductor 121 with the sleeve spring 48 of the spring jack 44, the contact 49 of this spring jack being connected with sleeve spring of jack 42, the contact 49 of this jack being connected with contact 49 of jack 41 and with the binding post 37. The contact 17 for switch arm 11 is connected by conductor 122 with one terminal of the signal 96 whose other terminal is connected by conductor 123 with the tip or ground spring of jack 44, the contact 50 of this jack being connected with the ground spring 47 of the jack 42, and the contact 50 associated with this spring being connected through resistance 124 with the binding post 36, this post having also direct connection with the contact 50 of jack 41. Contact 18 for switch arm 11 is connected by conductor 125 with the contacts 30 and 32 for switch arms 14 and 15, respectively. Contact 19 for switch arm 11 is connected by conductor 126 with the signal lamp 97 whose other terminal is connected by conductor 121 with the battery spring or jack 44. Contact 20 for switch arm 11 is connected by conductor 127 with signal lamp 98 whose other terminal is connected by conductor 123 with the ground spring 47 of jack 44. The contacts 21, 22, 24 and 25 of switch arm 12 are connected respectively with the contacts 16, 17, 19 and 20 of the switch arm 11.

Contact 28 for switch arm 13 is connected by conductor 128 with the conductor 123 which connects signal 96 with the ground spring of jack 44. Contact 26 for switch arm 13 connects with conductor 128 through a resistance 129, and contact 27 is connected by conductor 130 with the contact 34 of the switch arm 15. The contact 33 for switch arm 15 is connected by conductor 131 with the contact 23 for switch arm 12. The contact 29 of switch arm 14 is connected by conductor 132 with the battery spring 48 of jack 43 and contact 31 is connected by conductor 133 with the ground spring 47 of this jack.

The signal lamp 99 is connected with the binding post 35 and with the conductor 121 leading to the battery spring of jack 44. The springs 92 and 93 of key 90 connect respectively with conductors 108 and 116 which lead to switch arms 14 and 15. Normally the circuit bridged across these switch arms includes the resistances 58 and 70 and the ammeter upon depression keys 86 to 89, but, when the key 90 is depressed, the switch arms 14 and 15 will be directly connected together and the resistance and ammeter short-circuited.

To supply ground and battery connection to the test set, I have shown subscribers' answering cords A plugged into spring jacks 43 and 44, the cord in jack 43 supplying battery and ground for the contacts 29 and 31, respectively, for switch arm 14 and therefore for the ammeter circuits, while the cord connected with jack 44 supplied battery and ground connection for the conductors 121 and 123, with which the various target signals and signal lamps are connected. If a relay circuit to be tested is now connected directly with binding posts 38, 39 and 40, or a cord circuit connected with the jacks 45 and 46, the various switch levers can be operated to set up circuits to include the relays to be tested, and signal circuits for the relay contacts. After setting up desired resistances, the keys 86 to 89 are depressed to subject the relay winding to various current flows whose values are indicated on the ammeter.

The connections required and the various adjustments necessary to carry out a number of tests will now be described. On Fig. 4 a connecting cord 135 is plugged into spring jack 45 and into the jack 136 of a central station switch-board. In the switch-board circuit, the cut-off relay 137 connects with ground and with the tip contact of the switch-board jack. The conductor 138 which extends from the ring spring of the jack to ground through battery includes the contacts 139 of the cut-off relay and the winding 140 of the line relay. The conductor 141 which extends to ground from the sleeve spring of the jack includes the contacts 142 of the cut-off relay and the winding 143 of the line relay. The line lamp 144 connects with battery, and through contacts 145 with ground in the ordinary manner. Normally the contacts 145 are open and contacts 139 and 142 are closed.

Suppose it is desired to test the line relay winding 143 for operation, non-operation, non-release and release. The relay winding being connected with the sleeve side of the line and consequently with switch arm 13, the switch arm is moved to its contact 27 and switch arm 15 is moved to contact 34 to connect the circuit with the resistance and ammeter, and in order to supply battery for the circuit, the switch arm 14 is connected with contact 29. The circuit will then be traced as follows: from battery on cord A in jack 43 to contact 29, switch arm 14, conductor 108, resistance 70 to keys 86 to 89, to resistance 58, conductor 109, ammeter coil 84, through the ammeter key 91, conductor 116, switch arm 15, contact 34, conductor 130, switch arm 13, sleeve 53 of jack 45, the sleeve side of cord 135 and sleeve spring of the switch-board jack 136, conductor 141, contacts 142, and the relay winding 143 to ground. The resistance brushes are primarily all to the right to include the full resistance, and setting for desired test current flows is made. The key 86 is first closed and brushes 63 and 71 adjusted along the respective resistances until the ammeter shows the desired testing operating current, say .0115 amperes. Key 87 is then closed and brushes 64 and 72 adjusted until the ammeter indicates the desired non-operating current flow, say .009 amperes. Key 88 is then closed and brushes 65 and 73 adjusted for non-releasing or holding current, say .006 amperes. If the relay is to be tested for releasing current, the locking key 89 should be depressed until locked. The reason for this is that in telephone systems there is usually a leakage flow through the various lines and cables, this current flow being always present, and when a test is made the tested relay should always be subjected to this current flow. Therefore, when this leakage current is taken into account, the releasing key 89 is locked and adjustment made by brushes 66 and 74 to set the ammeter for the proper releasing current flow, say .004 amperes, before adjustment is made for the other testing current flows through circuits controlled by the keys 86, 87 and 88. After such setting up, the relay 143 may be tested and the results of the tests will in this case be indicated by the line lamp 144. To test the relay with operating current the key 86 is depressed and the corresponding test circuit closed. Lighting of the line lamp indicates response of the relay to such operating current. Key 86 is then released and key 87 is then depressed to close the circuit for a flow of .009 amperes. If the relay is properly adjusted, it will not become sufficiently energized under such current flow to close the signal lamp circuit and the lamp will not light. To test for non-releasing, both keys 86 and 88 are depressed to cause response of the relay and lighting of the lamp 144. The key 86 only is then released so that current flow is reduced to .006 amperes, and if the relay fails to release, that is, if it holds the lamp circuit closed for such current flow, it is properly adjusted. Now, if the button 88 is released to reduce the current flow to .004, which is the releasing current, and the relay releases and the lamp goes out, then it is properly adjusted for releasing current, it being understood that releasing current represents the leakage current the relay is subjected to in actual service and that the relay must not operate with such leakage or releasing current therethrough. If the relay fails to properly operate under the various test current flows therethrough, adjustment is usually made by adjusting the tension of the relay springs or the position of the armature with reference to the core.

If it is desired to test the relay winding 140 connected with the ring side of the line and with battery, the switch arm 14 is moved to the ground contact 31 to get ground connection through the cord A connected with jack 43, the circuit being from the battery through winding 140, contacts 139, the ring side of the spring jack 136 and cord 135 through conductor 118 to switch arm 12, conductor 131, switch arm 15, conductor 116, key 91, ammeter coil 84, conductor 109, resistance 58, test keys 86 to 89, resistance 70, conductor 108, switch arm 14, contact 31, conductor 133, and through spring jack 43 and cord A to ground. If the same current values are desired as for the test of relay winding 143, the various keys 86 to 89 are actuated in the same manner as above described, the signal lamp 144 serving to indicate the results of the test. If different current values are desired, then different adjustment must be made of the brushes on the resistances 58 and 70.

In the above tests, the switch-board or line lamp indicates the results of the tests. Where signals are not available on the switch-board, the test set signals are utilized for indicating whether or not the relay contacts have been properly operated. Suppose the cut-off relay 137 is to be tested. This relay being grounded, battery connection must be provided, and switch 14 is connected with battery contact 29. We then have the following circuit: from battery through switch arm 14 to the resistances, ammeter and keys 86 to 89, to switch arm 15, to contact 32, conductor 125 to contact 18, through switch arm 11 and conductor 117, and through the tip side of the jack 45, cord 135 and switch-board circuit, and through relay 137 to ground. Resistance adjustment is then made for the desired test current flows and the keys 86 to 89 are then operated to get the required tests. In order to determine whether the relay properly actuates its contacts 139, setting is made for use of the signal 96 whose one terminal is connected to ground through conductor 123 and the cord A in jack 44. We then have the following signal circuit: from battery through line relay winding 140, to contacts 139, conductor 138, through cord 135 and jack 45, conductor 118, switch arm 12, to contact 22, through conductor 122 and through the signal 96. The signal will now respond as the various current testing circuits are controlled by the keys 86 to 89 and the results of these tests can be determined. If the relay contacts were connected with ground instead of battery, then the switch 11 would be shifted to contact 16 to utilize the signal 95 which has connection with battery through conductor 121. In the tests just referred to, the signals 95, 96 are utilized because the signal circuit has the high resistance of the winding 140 therein. For low resistance signal circuits, the lamps 97, 98 will be utilized and connection made of switch arm 11 with contacts 19 or 20, depending upon whether the tested relay contacts are connected with ground or battery.

By means of the switches, setting can be made for many other tests of relay and signal circuits without disconnecting any of the relays or circuits from service. By plugging subscribers' cord circuits into the test set jacks 45 and 46, the relays, resistances and contacts connected therewith can be accurately tested. The key 90, as already explained, is bridged across the switch arms 14 and 15 and is used for shortening the resistance and ammeter out of circuit before each test in order to send saturating current flow through the relay to be tested before a test is made, such saturation insuring uniformity and accuracy of the tests.

It will be apparent from the circuit diagram, Fig. 5, that in making all of the above tests in which the adjustable resistance coils 70 and 80 are included, said resistance coils are connected in series and the conductor interconnecting these coils is normally open at the contacts of keys 86, 87, 88, and 89. In other words, in setting up the apparatus to be tested it is connected in series with an ammeter and a source of current and the two adjustable resistance coils 58 and 70. These resistance coils are each fitted with four sliding contacts which may be moved along the surface of the coil for the purpose of obtaining the desired amount of resistance in the test circuit. Each of the sliding contacts on the coil 58 is connected to one of the sliding contacts of the coil 70, the connections between these contacts being normally open at the keys 86 to 89 inclusive. When the contacts on the resistance coils have been properly set for their respective tests, said tests can be rapidly made by successively depressing each of the keys 86 to 89, thereby connecting a portion of the resistance of the coils 58 and 70 in circuit with the source of current, the ammeter, and the apparatus to be tested. Whenever a test is made by depressing one of the keys 86 to 89 inclusive, such test will be made absolutely independent of the other resistance settings on the coils 58 and 70, as these circuits are normally open at the key contacts. Obviously more than four such test circuits can be set up simultaneously and likewise more than two adjustable resistance coils can be used. With this circuit arrangement it is possible to set up a large number of tests for a piece of apparatus and then successively subject said apparatus to these tests without in any way disturbing the resistance settings. This is particularly advantageous when tests are to be duplicated on a large number of pieces of apparatus of like character, for under such circumstances when the resistances have been set, the apparatus can be readily and rapidly tested without any further setting of the test set by the mere operation of the keys 86 to 89 inclusive.

What is claimed is:

1. In an electrical testing set of the class described, the combination of a plurality of terminals with which relays or other devices to be tested may be connected, a current measuring circuit, switches for selectively connecting said terminals with said current measuring circuit, a plurality of adjustable resistance coils, means for simultaneously setting up a plurality of resistances by interconnecting a plurality of said coils, and means for selectively and successively connecting one of said set-up resistances to said current measuring circuit.

2. In an electrical testing set of the class described, the combination of terminals with which relay or other devices to be tested may be connected, a testing circuit, switch mechanisms for selectively connecting said terminals with said testing circuit, a plurality of adjustable resistance coils, a plurality of branch circuits, and a predetermined resistance in each branch said resistance comprising a part of each one of said coils, keys for selectively connecting said branch circuits with said testing circuit, and a current measuring instrument connected in said testing circuit.

3. In an electrical testing set of the class described, the combination of a plurality of terminals with which relays or other devices to be tested may be connected, a testing circuit, switch mechanisms for selectively connecting said testing circuit with said terminals, variable resistance, movable contacts for said resistance for selecting portions of said resistance for inclusion in the testing circuit, a plurality of keys for selectively closing the testing circuit through the selected resistances, and a current measuring instrument connected with the testing circuit.

4. In an electrical testing set of the class described, the combination of a current circuit, switch mechanisms for connecting the energizing winding of an electromagnet switch device with said current circuit, resistances, keys for selecting the resistances for inclusion in said current circuit, a current measuring instrument connected with said current circuit, a signal circuit, signals connected with said circuit, and switch mechanisms for connecting with said signal circuit the contacts of said electromagnetic switch device.

5. In an electrical testing set of the class described the combination of spring jacks for receiving plugs of cord circuits with which relays are connected, a current circuit, switches for selectively connecting the spring jack contacts with said current circuit to thereby connect the corresponding cord relay with said circuit, resistances, keys for selectively connecting resistances with said current circuit to cause corresponding current flow therethrough, and a current measuring instrument connected with said circuit.

6. In an electrical testing set of the class described, the combination of spring jacks for receiving plugs of cord circuits with which relays are connected, a current circuit, switches for selectively connecting the spring jack contacts with said current circuit to thereby connect the corresponding cord relay with said circuit, resistances, keys for selectively connecting resistances with said current circuit to cause corresponding current flow therethrough, a current measuring instrument connected with said circuit, signal mechanism connected with said circuit, and switch mechanisms for connecting said signal circuit with the contact of the switch jack with which contacts of the tested relay are connected whereby the signals will respond in accordance with current flow through the current circuit and relay.

7. In an electrical testing set, the combination of a supporting base, terminals on said base for the connection of devices to be tested, adjustable resistance on said base, an electrical indicating instrument, testing circuits including portions of said resistance and connected with said terminals, current source terminals on said support connected with said circuits, and keys for said circuits for controlling the successive closure thereof and inclusion in said circuits of the device to be tested connected with said terminals.

8. In an electrical test set of the class described, the combination of a supporting base, spring jacks on said base for connection with cords with which devices to be tested are connected, switches on said supporting base comprising switch arms connected with terminals of said spring jacks, contacts for said switch arms and current and signaling circuits leading therefrom, adjustable resistance, a current indicating instrument on said base, keys on said base for connecting said resistance and instrument in said current circuits, signals on said base included in said signaling circuits, and additional spring jacks for receiving cords with whose conductors battery and ground are connected.

9. In an electrical test set of the class described, the combination of terminals for the connection of electro-magnetic devices to be tested, a plurality of switch mechanisms each comprising a switch arm and contacts, each terminal being connected with the switch arm of one of said switch mechanisms, signal circuits leading from contacts of said switch mechanisms, target signals in some of said circuits and lamp signals in the others, ground and battery terminals for said circuits, a current circuit extending from other contacts of said switch mechanisms, an indicating instrument for said circuit, resistances, and switch mechanisms for selectively connecting said resistances in said current circuit.

10. In an electrical testing set, the combination of terminals for battery and ground and devices to be tested a testing circuit, a plurality of adjustable resistance coils, means for simultaneously setting up a plurality of resistances with said coils for inclusion in said testing circuit, a plurality of keys for selectively and successively connecting one of said set-up resistances with said testing circuit, and an electrical indicating instrument connected with said circuit.

11. In an electrical test set, a testing circuit, an adjustable resistance, a second adjustable resistance, means for simultaneously setting up a plurality of test circuits said circuits each including a part of said two adjustable resistances, and means thereafter for successively connecting said set up resistances in circuit with said testing circuit for the purpose of making a plurality of tests.

12. In an electrical testing set, a testing circuit, an adjustable resistance consisting of comparatively large units, a second adjustable resistance consisting of comparatively small units, means for simultaneously setting up a plurality of test circuits with said large and small resistance units, and means thereafter for successively connecting said set up resistances in circuit with said testing circuit for the purpose of making a plurality of tests.

13. A testing circuit comprising in combination, a plurality of adjustable resistances, means interconnecting said resistances, an electrical measuring instrument, a source of current supply and an article to be tested interconnected and connected to said resistances, means for simultaneously setting up a plurality of tests on said resistances, and means operable and associated with said interconnecting means for making a plurality of successive tests with said set up resistances.

14. In combination, an adjustable resistance comprising comparatively large units, an adjustable resistance comprising comparatively small units, circuit connections including an electrical measuring instrument, an article to be tested and a source of current supply, means for simultaneously setting up a plurality of resistance combinations on said resistances, and means to successively connect each of said resistance combinations in circuit for the purpose of testing said article.

15. A testing circuit comprising in combination, a plurality of adjustable resistances, an electrical measuring instrument, a source of current supply and an article to be tested serially connected to said resistances, a plurality of conductors normally interrupted interconnecting said resistances, and means operable to successively complete the connection in each of the conductors interconnecting said resistances whereby said article will be subjected to a plurality of tests.

16. In combination, an adjustable resistance comprising comparatively large units, an adjustable resistance comprising comparatively small units, an electrical measuring instrument, a source of current supply and an article to be tested serially connected to said resistances, a plurality of conductors normally interrupted interconnecting said resistances, and means operable to successively connect the conductors interconnecting said resistances whereby said article will be subjected to a plurality of tests.

17. In combination, an adjustable resistance comprising comparatively large units, an adjustable resistance comprising comparatively small units, a plurality of slidable contacts associated with each of said resistances, an electrical measuring instrument, a source of current supply and an article to be tested serially connected to said resistances, a plurality of conductors normally interrupted interconnecting the slidable contacts of said resistances, said slidable contacts being variously set for the purpose of a plurality of tests, and means operable to successively connect the conductors interconnecting the slidable contacts whereby the article to be tested will be subjected to a plurality of tests.

In witness whereof, I hereunto subscribe my name this 22nd day of May, 1916.

BENJAMIN H. SKINNER.

Copies of this patent may be obtained for five cents each, by addressing the "Commissioner of Patents, Washington, D. C."